C. E. GODLEY.
VEHICLE LAMP.
APPLICATION FILED JULY 13, 1914.
1,125,089.
Patented Jan. 19, 1915.
2 SHEETS—SHEET 1.
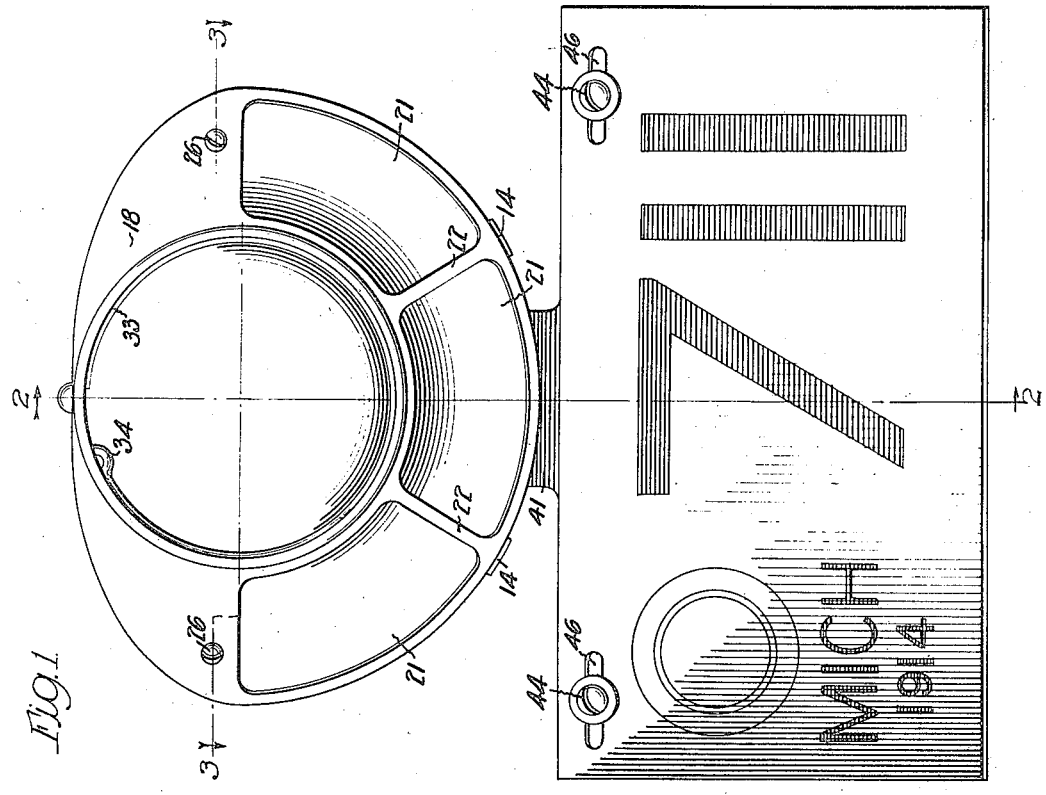
Witnesses
E. R. Barrett
Hugo W. Kreinbring
Inventor
Charles E. Godley,
By Pagelsen & Spencer.
Attorney C. E. GODLEY.
VEHICLE LAMP.
APPLICATION FILED JULY 13, 1914.
1,125,089.
Patented Jan. 19, 1915.
2 SHEETS—SHEET 2.
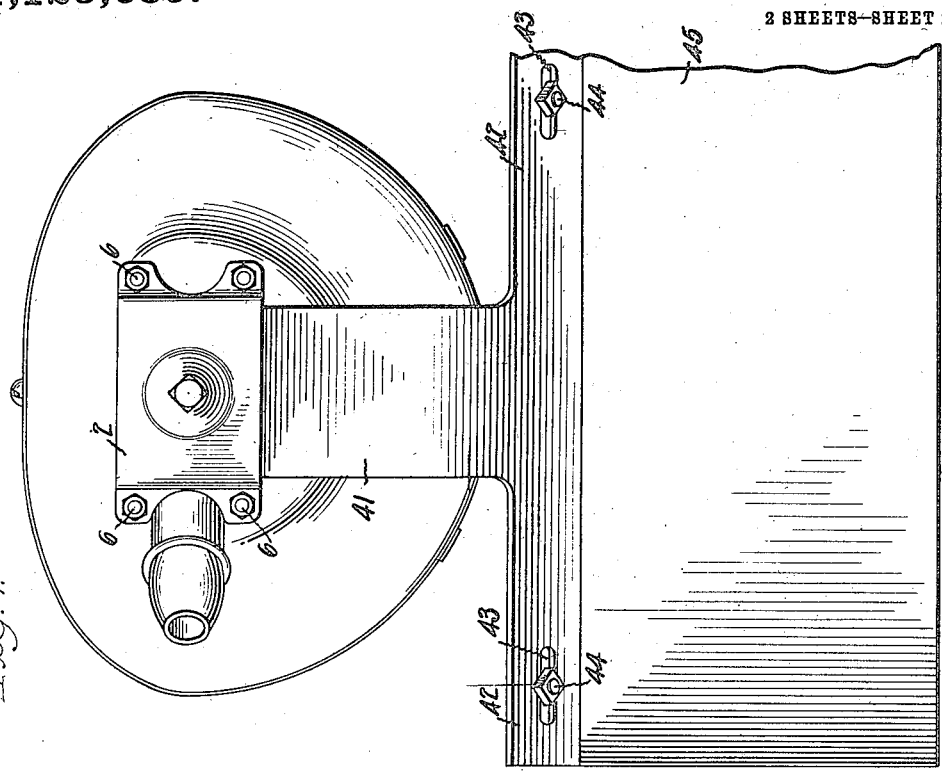
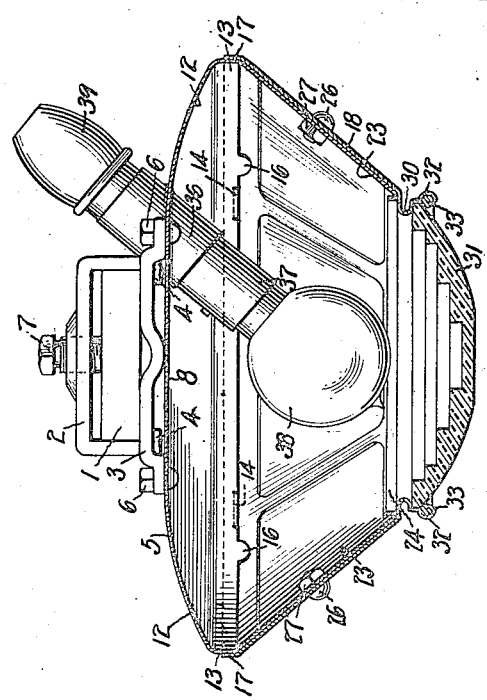
Witnesses
E. R. Barrett
Hugo W. Kreinbring.
Inventor
Charles E. Godley.
By Pagelsen & Spencer.
Attorney

UNITED STATES PATENT OFFICE.

CHARLES E. GODLEY, OF DETROIT, MICHIGAN.

VEHICLE-LAMP.

1,125,089.

Specification of Letters Patent.

Patented Jan. 19, 1915.

Application filed July 13, 1914. Serial No. 850,629.

*To all whom it may concern:*

Be it known that I, CHARLES E. GODLEY, a citizen of the United States, and a resident of Detroit, in the county of Wayne and State of Michigan, have invented a new and Improved Vehicle-Lamp, of which the following is a specification.

This invention relates to a lamp, more particularly to a tail-lamp for vehicles; and its object is to provide means whereby a colored or warning light may be projected directly back from the vehicle, and a clear or white light may be projected rearwardly and downwardly upon the surface of the roadway; also to provide a mutual relation of lamp and license-tag support such that the tag will be brightly illuminated.

This invention consists in the details of construction shown and described, and particularly pointed out in the claims.

In the drawings, Figure 1 is a front elevation of the lamp showing the license-tag in position in respect thereto. Fig. 2 is a section on the line 2—2 of Fig. 1. Fig. 3 is a section on the line 3—3 of Fig. 1. Fig. 4 is a rear view of the parts shown in Fig. 1 when detached from the support. Fig. 5 is a fragmentary section showing the connection between the back of the lamp and the lamp body and the means for preventing the transparent sheet from buckling. Fig. 6 is a fragmentary section corresponding to the lower portion of Fig. 2 and showing a modified construction.

Similar reference characters refer to like parts throughout the several views.

In the embodiment shown, 1 indicates any desired form of support that may be carried at the rear of a motor vehicle. Inclosing the support on three sides is the U-shaped bracket member 2, the ends of which project through openings in the bracket member 3, with which the fourth side of the support is engaged, and are bent over as indicated at 4. The ends of the member 3 are, in turn, secured to the back 5 of a lamp by means of the bolts or rivets 6, or in any other preferred manner; and the member 2 is provided with a set screw 7 by which the parts may be clamped to the support 1.

The lamp-back or reflector 5 comprises a central portion 8, that may be plane as shown or curved, the upper edge of which merges into a sharply curved portion 9, the lower edge and the sides of the central portion merging into the portion 12, the curvature of which, as compared with that of the portion 9, is preferably slight. The lamp-back 5 extends forwardly from the curved portions 9 and 12 in the form of a tubular edge 13, each side portion of which is preferably provided with a laterally extending lug 14; and to the inner surface of the upper central portion of the edge 13 a threaded nut 15 may be soldered or otherwise secured. The edge 13 has also projecting therefrom the lugs 16 that may be inclined to the axis of the tubular edge 13, as best shown in Fig. 5.

Tightly inclosing the edge 13 is the rearwardly extending edge 17 of the lamp body 18, said edge being perforated to receive the lugs 14 on the back 12, and also being perforated to allow the passage of a screw 19 that extends through the edge 13 and is received in the nut 15. Other means of connecting the lamp body to the back may be used, but I prefer the means just described for the reason that it is easily connected or disconnected, is cheap, effectually prevents rattling and excludes dust. The upper element of the lamp body, in the embodiment shown, extends forward substantially horizontally as indicated in Fig. 2, whereas the elements of the lower half are sharply inclined upwardly and inwardly, and those of the upper lateral portions or shoulders gradually change from the sharply inclined position to a horizontal line. The lower portion is cut away to form openings 21, the opposite edges of which are joined at intervals by the strips 22. These openings are closed by a transparent sheet 23, preferably celluloid, the inner edge of which may register with the end of the tubular portion 13 of the back, being retained against the inner surface of the lamp body and prevented from buckling by the lugs 16. The outer edge of the transparent sheet is received between the lamp body and the curved strip 24 that is secured to the body and extends inwardly a slight distance. The transparent sheet 23 extends up the sides of the lamp body to a point indicated by the line 25 (Fig. 2), and is secured thereto by the screws 26 and the nuts 27.

The outer end of the lamp-body may be provided with an inwardly extending circumferential bead 30, that constitutes a seat for a colored (preferably ruby) lens 31; and from this bead the material of the body extends forwardly to form an outwardly turned bead 32, between which and the outer surface of the lens is received a resilient lens-securing wire 33, one end of the latter preferably being curved, as indicated at 34, to provide for the insertion of a pointed instrument whereby the wire may be removed from its seat. While this means of securing the lens in the lamp body is simple and efficient, it should be understood that various other means may be employed without departing from the general scope of my invention.

Projecting forward at an angle from the back of the lamp is a sleeve 36 through which passes an ordinary electric lamp socket 37 that supports an electric lamp bulb 38. The socket is provided at its rear end with any approved form of connector 39 from which the circuit wires (not shown) extend to a convenient source of current. The member 3 may be curved downwardly at 41 to reinforce the back of the lamp, the lower end being extended laterally at 42 and provided with the slots 43 through which the bolts 44 may extend to adjustably support the license tag 45, that may also be provided with the slots 46 if desired.

I find it desirable in certain instances to corrugate the lower inner surface of the reflector transversely as shown at 47 in Fig. 6, thus providing for a more efficient distribution of light than is obtained with the curved surface alone.

Operation: The filament of the lamp bulb is arranged substantially in the axis of the colored lens 31, and from the latter light coming directly from the filament, together with some of the light reflected from the central portion 8 of the reflector, is projected rearwardly from the vehicle. Light coming directly from the filament, as well as light reflected from the upper portion of the lamp body, passes downwardly through the transparent sheet 23 and illuminates the license tag; while some of the light reflected from the central portion of the reflector, and a large proportion of the light reflected from the curved portion 12, is projected rearwardly to illuminate the roadway directly behind the vehicle and at both sides thereof.

It is obvious that various changes may be made in the details of my construction without departing from the spirit of my invention. I do not, therefore, wish to be limited otherwise than as indicated by the subjoined claims.

The lamp-back and lamp-body together form a casing for the lamp bulb, and this term is used for convenience in some of the claims.

I claim:—

1. A tail light for vehicles comprising a colored member through which light may pass rearwardly from the vehicle, a lamp body in which said member is supported, the upper portion of said lamp body being substantially cylindrical, the lower and the side portions of said lamp body flaring outwardly from the vicinity of the colored member and having an opening through which light may pass downwardly and rearwardly to illuminate the surface of the roadway, a transparent closure for the opening, a lamp-back to which the body is connected, said lamp-back being adapted to reflect light and comprising a central portion that merges into portions of slight curvature at the bottom and sides, said bottom and side portions serving to reflect light rearwardly from the vehicle through the opening in the lamp body, the upper portion of the lamp body serving to reflect light downwardly through the opening in the lamp body, and a source of light located in the lamp body.

2. A tail light for vehicles comprising a colored member through which light may pass rearwardly from the vehicle, a lamp body in which said member is supported, the upper portion of said lamp body being substantially cylindrical, the lower and the side portions of said lamp body flaring outwardly from the vicinity of the colored member and having an opening through which light may pass downwardly and rearwardly to illuminate the surface of the roadway, a transparent closure for the opening, a lamp-back to which the body is connected, said lamp-back being adapted to reflect light and comprising a central portion that merges into portions of slight curvature at the bottom and sides, said bottom and side portions serving to reflect light rearwardly from the vehicle through the opening in the lamp body, the upper portion of the lamp body serving to reflect light downwardly through the opening in the lamp body, a tag bearing characters, means for supporting the tag beneath the opening in such position that some of the light passing through the opening falls thereon and is reflected rearwardly therefrom, and a source of light located in the lamp body.

3. A tail light for vehicles comprising a colored member through which light may pass rearwardly from the vehicle, a lamp body in which said member is supported, the upper portion of said lamp body being substantially cylindrical, the lower and the side portions of said lamp body flaring outwardly from the vicinity of the colored member and having an opening through which light may pass downwardly and rearwardly to illuminate the surface of the roadway, a transparent closure for the opening, a lamp-back to which the body is connected, said lamp-back being adapted to reflect light and comprising a central portion that merges into portions of slight curvature at the bottom and sides and also merging into a portion of relatively sharp curvature at the top, said bottom and side portions serving to reflect light rearwardly from the vehicle through the opening in the lamp body, the upper portion of the lamp body serving to reflect light downwardly through the opening in the lamp body, and a source of light located in the lamp body.

4. A lamp comprising a colored member through which light may pass in a given general direction, a lamp body in which said member is supported, the lower and the side portions of said lamp body being of substantially frusto-conical form, and having an opening through which light may pass, the smaller base being located adjacent the colored member, a transparent closure for the opening, a reflector secured to the lamp body, said reflector comprising a central portion and side and bottom portions of slight curvature, and a source of light positioned in the lamp body, said curved side and bottom portions of the reflector being arranged to project light in the same general direction as it is projected through the colored member, and the source of light being so positioned that portions of the light emanating therefrom pass laterally through the opening in the lamp body in a general direction at substantially right angles to the direction in which light passes through the colored member.

5. A lamp comprising two members, one a lamp body and the other a reflector, said lamp body having one end considerably smaller than the other and flaring from the smaller to the larger end, a lateral opening in the flaring portion, a lens supported in the small end of the lamp body, the reflector being positioned to close the larger end of the lamp body, and comprising a central portion, part of which merges into slightly curved outer portions, a source of light in the lamp body, said slightly curved portions of the reflector being so positioned that light falling thereon is projected through the opening in the lamp body substantially parallel to the light which passes from the source through the lens, and the source of light being so positioned that light also passes laterally through the opening in the lamp body in a direction at substantially right angles to the light which passes through the lens.

6. In a lamp, a reflector, a bracket member rigidly secured to the reflector and having perforated portions spaced therefrom, a U-shaped bracket member the ends of which pass through the perforations in the first mentioned bracket member and whereby the two bracket members are rigidly secured together, and a set screw passing through one of the members for clamping the members to a support.

7. A lamp comprising a colored member through which light may pass in a given general direction, a lamp body in which said member is supported, the lower and the side portions of said lamp body being of substantially frusto-conical form and having an opening through which light may pass, the smaller base being located adjacent the colored member, a reflector closing the larger base of the lamp body and having lugs projecting therefrom, said lugs being spaced angularly from each other and also being spaced slightly from the inner surface of the lamp body, a retainer projecting from the smaller end of the lamp body and spaced slightly from the inner surface thereof, and a transparent sheet closing the opening in the lamp body, one edge of the sheet being received between the retaining member and the inner surface of the lamp body and the opposite edge being received between the lugs on the reflector and the inner surface of the lamp body, whereby the closure is retained in position and prevented from buckling.

8. A lamp for motor vehicles comprising a concentrated source of light, a casing, a lens supported in the casing and arranged to project some of the light rearwardly therefrom in substantially parallel colored beams, a transparent member supported by the casing, a plurality of reflecting surfaces one of which is arranged to project light from the source through the transparent member in a direction substantially parallel to that which passes through the lens, and another of which is arranged to project light through the transparent member in a plane at substantially right angles to the direction in which the light passes through the lens.

9. A lamp for motor vehicles comprising a source of light, a casing, a colored lens supported in the casing and arranged to project some of the light rearwardly therefrom in substantially parallel beams, a transparent member supported by the casing, a plurality of reflecting surfaces, a tag supported in proximity to the casing, one of the reflecting surfaces being arranged to project light from the source through the transparent member in a direction substantially parallel to that which passes through the lens, and another of the reflecting surfaces being arranged to project light through the transparent member in a plane at substantially right angles to the direction in which the light passes through the lens, whereby the tag is illuminated.

10. A lamp for motor vehicles comprising an electric lamp bulb having a filament therein, a casing inclosing the bulb, a lens supported in the casing and arranged to project some of the light from the filament rearwardly from the casing in substantially parallel colored beams, a transparent member supported by the casing, a plurality of reflecting surfaces one of which is arranged to project light from the filament through the transparent member in rearwardly directed rays that are adapted to illuminate the surface of the ground somewhat to the rear of the vehicle, and another of which is arranged to project light through the transparent member in a plane at substantially right angles to the direction in which the light passes through the lens, whereby the lamp is rendered visible from the side of the vehicle.

11. A tail light for vehicles comprising a member through which colored light may pass rearwardly from the vehicle, a lamp body in which said member is supported, the upper portion of said lamp body being substantially cylindrical, the lower and the side portions of said lamp body flaring outwardly from the vicinity of the member and having an opening through which light may pass downwardly and rearwardly to illuminate the surface of the roadway, a transparent closure for the opening, a lamp-back to which the body is connected, said lamp-back being adapted to reflect light and comprising a central portion that merges into portions of slight curvature at the bottom and sides, said bottom and side portions serving to reflect light rearwardly from the vehicle through the opening in the lamp body, the upper portion of the lamp body serving to reflect light downwardly through the opening in the lamp body, and a source of light located in the lamp body.

12. A tail light for vehicles comprising a member through which light may pass rearwardly from the vehicle, a lamp body in which said member is supported, the upper portion of said lamp body being substantially cylindrical, the lower and the side portions of said lamp body flaring outwardly from the vicinity of the member and having an opening through which light may pass downwardly and rearwardly to illuminate the surface of the roadway, a transparent closure for the opening, a lamp-back to which the body is connected, said lamp-back being adapted to reflect light and comprising a central portion that merges into portions of slight curvature at the bottom and sides, said bottom and side portions serving to reflect light rearwardly from the vehicle through the opening in the lamp body, the upper portion of the lamp body serving to reflect light downwardly through the opening in the lamp body, a tag bearing characters, means for supporting the tag beneath the opening in such position that some of the light passing through the opening falls thereon and is reflected rearwardly therefrom, and a source of light located in the lamp body.

13. A tail light for vehicles comprising a member through which colored light may pass rearwardly from the vehicle, a lamp body in which said member is supported, the upper portion of said lamp body being substantially cylindrical, the lower and the side portions of said lamp body flaring outwardly from the vicinity of the member and having an opening through which light may pass downwardly and rearwardly to illuminate the surface of the roadway, a transparent closure for the opening, a lamp-back to which the body is connected, said lamp-back being adapted to reflect light and comprising a central portion that merges into portions of slight curvature at the bottom and sides and also merging into a portion of relatively sharp curvature at the top, said bottom and side portions serving to reflect light rearwardly from the vehicle through the opening in the lamp body, the upper portion of the lamp body serving to reflect light downwardly through the opening in the lamp body, and a source of light located in the lamp body.

14. A lamp comprising a member through which light may pass in a given general direction, a lamp body in which said member is supported, the lower and the side portions of said lamp body being of substantially frusto-conical form, and having an opening through which light may pass, the smaller base being located adjacent the member, a transparent closure for the opening, a reflector secured to the lamp body, said reflector comprising a central portion and side and bottom portions of slight curvature, and a source of light positioned in the lamp body, said curved side and bottom portions of the reflector being arranged to project light in the same general direction as it is projected through the first mentioned member, and the source of light being so positioned that portions of the light emanating therefrom pass laterally through the opening in the lamp body in a general direction at substantially right angles to the direction in which light passes through the first mentioned member.

In testimony whereof I have signed this specification in the presence of two subscribing witnesses.

CHARLES E. GODLEY.

Witnesses:
EDWARD N. PAGELSEN,
HUGO W. KREENBRING.